J. W. MORRIS.
HAT FASTENER.
APPLICATION FILED JUNE 14, 1910.

975,060.

Patented Nov. 8, 1910.
2 SHEETS—SHEET 1.

Witnesses
Frank A. Fahl
May Layden

Inventor
John W. Morris,
by Bradford & Hood.
Attorneys.

J. W. MORRIS.
HAT FASTENER.
APPLICATION FILED JUNE 14, 1910.

975,060.

Patented Nov. 8, 1910.
2 SHEETS—SHEET 2.

Witnesses
Frank A. Fahl
May Layden

Inventor
John W. Morris,
By Bradford & Hood,
Attorneys

UNITED STATES PATENT OFFICE.

JOHN W. MORRIS, OF INDIANAPOLIS, INDIANA.

HAT-FASTENER.

975,060.  Specification of Letters Patent.  Patented Nov. 8, 1910.

Application filed June 14, 1910. Serial No. 566,885.

*To all whom it may concern:*

Be it known that I, JOHN W. MORRIS, a citizen of the United States, residing at Indianapolis, in the county of Marion and State of Indiana, have invented a new and useful Hat-Fastener, of which the following is a specification.

The object of my invention is to provide a secure and easily manipulated device for fastening hats upon the heads, and in which there shall be no projecting points on the outside.

Said invention consists in a structure designed to be secured within the body of the hat (being preferably arranged for the most part, beneath the lining) and is provided with a series of points capable of being inserted into and withdrawn from the hair by means of operating rods extending to the outer sides of the hat.

A fastener embodying my said invention will be first fully described, and the novel features thereof then pointed out in the claims.

Figure 1:
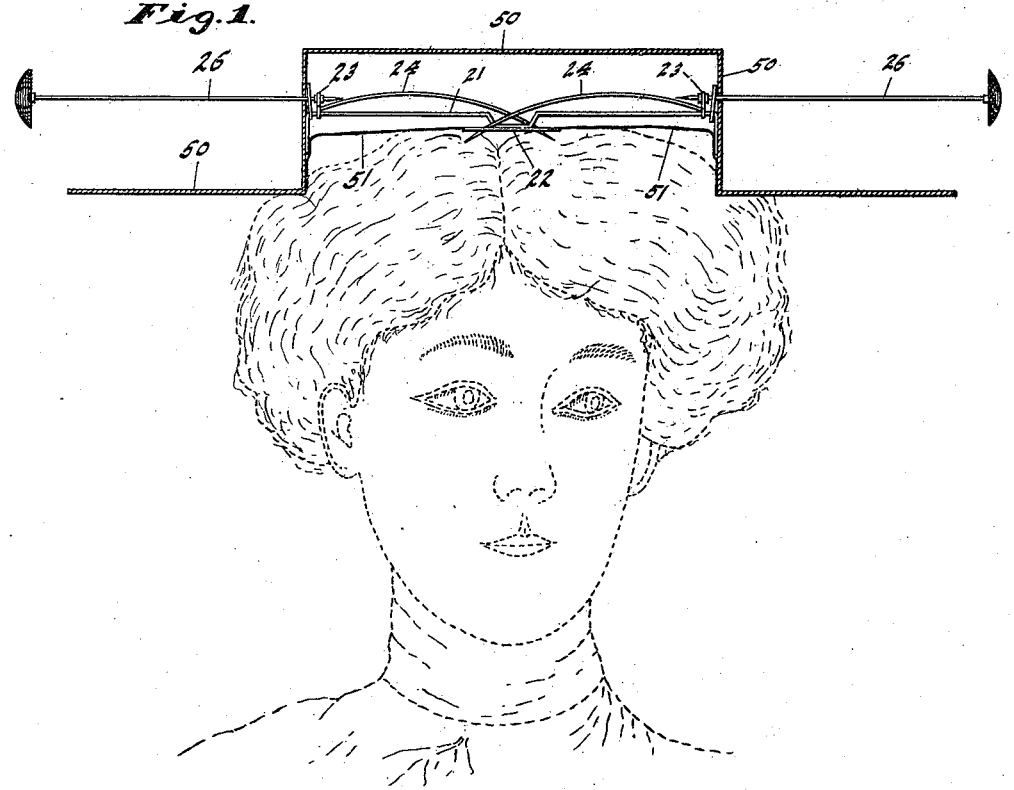
Figure 2:
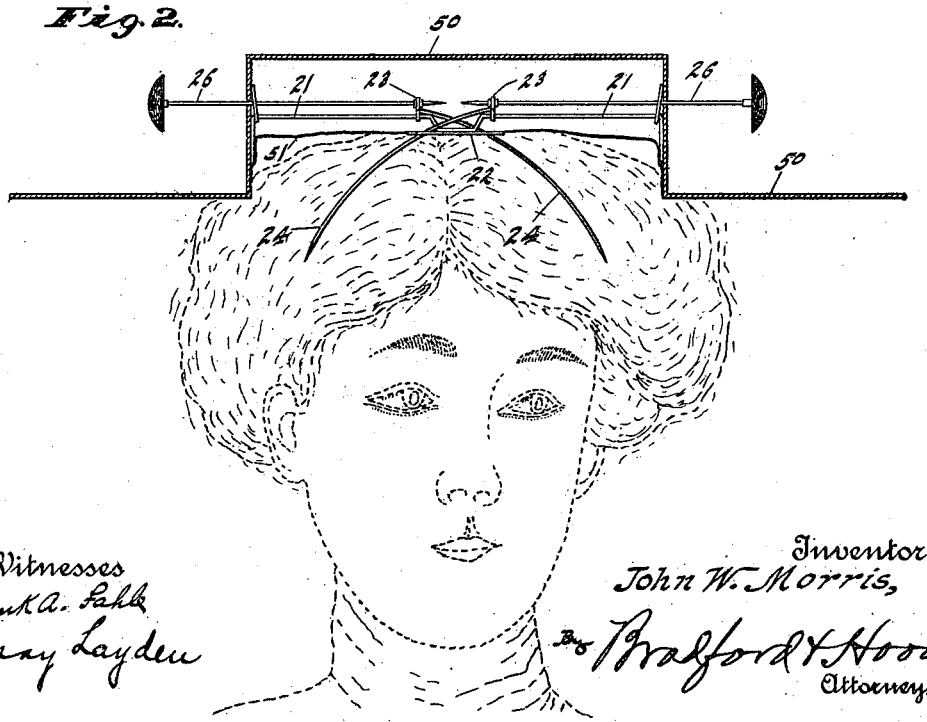
Figure 3:
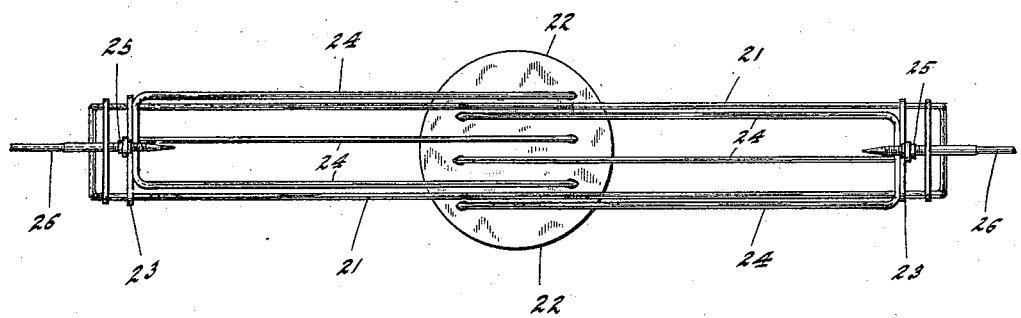
Figure 4:
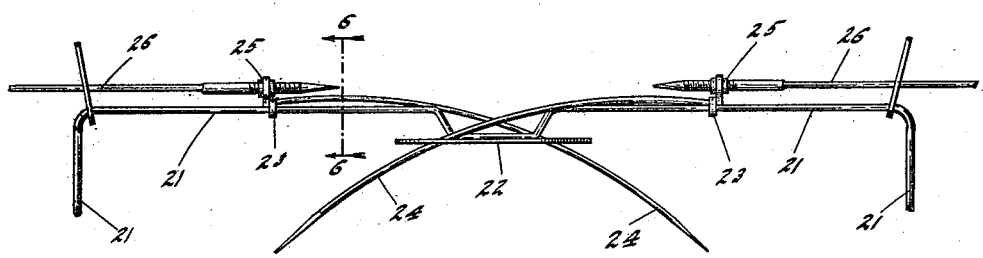
Figure 5:
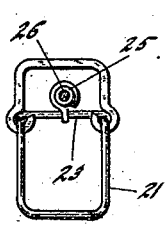
Figure 6:
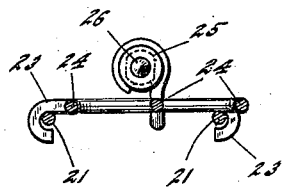
Figure 7:
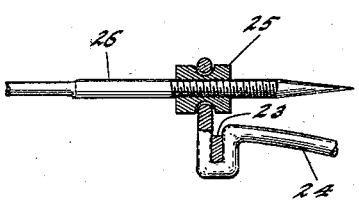

Referring to the accompanying drawings, which are made a part hereof, and on which similar reference characters indicate similar parts, Figure 1 is a sectional view of a hat, with a human head indicated therein in dotted lines, the hat being provided with one of my improved fasteners in the position which it occupies when the hat is first placed upon the head, and before the fastener has been moved to fastening position; Fig. 2 a similar view after the fastener has been moved to its fastening position; Fig. 3 a plan view on an enlarged scale of the fastener separately, the parts being in the position indicated in Fig. 1, the operating rod being, however, broken away to enable the view to be made on the scale desired; Fig. 4 a side elevation of the same, but with the fastener pins partly moved in; Fig. 5 an end elevation; Fig. 6 a transverse sectional view on a still further enlarged scale at the points indicated by the broken lines 6 6 in Fig. 4, and Fig. 7 a detail longitudinal central sectional view.

As best shown in Figs. 1 and 2, the frame 21 of my improved fastener is designed to be secured within the body of the hat, 50, and beneath the lining, 51, thereof, where the structure is for the most part concealed. Rigidly secured to this frame 21 is a guide 22, preferably in the form of a plate or disk, and which may be and generally is placed outside the lining of the hat. The frame 21 being made of wire, its sides serve as guides or ways upon which cross-heads 23 are mounted and adapted to travel back and forth. These cross-heads are provided with engaging pins or tines 24, which are curved as shown, and which pass down through suitable openings in the guide plate 22, each cross-head and its tines forming a fork-like member. The cross-heads 23 have nuts 25 secured thereto, said nuts being preferably loosely mounted in the eyes formed on the cross heads, said eyes being shown as being formed on the ends of the wires forming the center pins or tines of the fastening members. The loosely mounted arrangement of the nuts enables the fork-like engaging members to have a movement relative to the rods, so that while the rods move substantially horizontally back and forth the engaging members can travel in a curved path. Operating rods 26 pass in through the hat from the outside and engage with these nuts, and the fork-like engaging portions are adapted to be operated thereby. The inner ends of these operating rods are pointed and screw-threaded as shown, and are thus adapted to engage conveniently with the nuts carried by the cross heads. The outer ends are provided with knobs or handle pieces, which may be made ornamental or of any form desired.

As will be readily seen, the wearer of a hat provided with a fastener of this description needs only to place it upon her head and grasp the operating rods by the heads and push them inwardly, when the tines of the fork-like fastener will enter the hair, and hold the hat securely while there are no objectionable projection points upon the outside.

Having thus fully described my said invention, what I claim as new and desire to secure by Letters Patent is:—

1. The combination, in a hat fastener, of a suitable frame adapted to secure within the hat, a perforated plate secured to said frame for guiding the points of the fasteners, the said fasteners slidably mounted on said frames, and operating rods adapted to extend to the outside of the hat for moving said fastener members.

2. The combination, in a hat fastener, of a frame work, fork-like engaging members slidably mounted on said frame work, nuts carried by said fork-like engaging members, and operating rods pointed and screw-threaded at their inner ends adapted to pass in through the sides of the hat and engage with the nuts of the fork-like engaging members.

3. The combination, in a hat fastener, of a frame work, fork-like engaging members slidably mounted on said frame work, nuts carried by said fork-like engaging members, and operating rods pointed and screw-threaded at their inner ends adapted to pass in through the sides of the hat and engage with the nuts of the fork-like engaging members, said nuts being loosely mounted on the respective engaging members whereby the parts are permitted a movement relative to each other.

In witness whereof, I have hereunto set my hand and seal at Indianapolis, Indiana, this eighth day of June, A. D. one thousand nine hundred and ten.

JOHN W. MORRIS. [L. S.]

Witnesses:
CHESTER BRADFORD,
FRANK A. FAHLE.